Sept. 16, 1958     H. J. VAHRENWALD     2,851,810
FISH HOOKING DEVICE
Filed July 12, 1955

INVENTOR.
Henry J. Vahrenwald
BY
Attorney

United States Patent Office 2,851,810
Patented Sept. 16, 1958

2,851,810

FISH HOOKING DEVICE

Henry J. Vahrenwald, Elmhurst, Ill.

Application July 12, 1955, Serial No. 521,533

3 Claims. (Cl. 43—15)

The present invention relates to automatic fish-hooking bobber assemblies of the type wherein a spring is deflected and tensed to a set or cocked condition, and arranged for release of the spring by a pull, tug or twitch resulting from disturbance by a fish of bait associated with a hook attached to a line depending from and supported by the bobber while floating at the water surface, and attached to the spring in such manner that its movement to its normal untensed condition imparts to the line and hook a quick jerk suitable for hooking the fish.

The device is principally useful in catching fish of nibbling or bait-stealing varieties, the habit of which is to deal with baited hooks in such manner, as by nibbling off bait edges, grasping bait edges and pulling, cautious and gentle tugging at the bait, so as to either escape giving evidence to the fisherman of the activity, or to render the jerking action of the fisherman slower than that necessary to hook the fish. Automatic fish-hooking spring devices to be fully effective should be arranged to hook fish by providing very rapidly executed line-jerking response to fish tugs, and should be highly sensitive to gentle tugs and twitches.

Numerous devices of the general character here involved are in the prior art, and the device herein disclosed represents marked improvements over such devices, principally in respect to sensitivity and reliability of operation, simplicity and economy of manufacture and assembly of component parts, ready and substantial adjustability of sensitivity to suit individual preferences of different fishermen or varying characteristics of fish biting encountered in different fishing situations, absence of complicated manipulation in setting, and configuration and arrangement presenting minimum possibilities of entanglement with or being interfered with by floating material, weeds, and so forth.

These objects primarily are accomplished by employment of a single spring element as the entire mechanism, as distinguished from such prior art devices as one including a trigger for cocking and releasing the spring, a line holding element biased by a separate spring, and other multi-element assemblies of various complexities. In the instant device, a mounting portion of the single spring element is secured to one portion of the bobber float and an acting part of the spring element is cocked by readily releasable engagement with a second portion of the bobber in such fashion that a gentle tug at a line fixed to the acting part of the spring element releases the latter and permits it to snap to its normal, untensed condition, thereby imparting a fish-hooking jerk to the attached line.

Describing the drawings in detail, the device comprises a float comprising a body 6 and a member 7 projecting therefrom in such disposition that, while the device is floating during its use in fishing, and with a fishing line that is rigged with a sinker and/or a baited hook and thereby weighted projecting member 7, the latter will be maintained in suspended, depending relation to body 6. Conveniently and as shown, the float may be a typical fishing bobber assembly wherein member 7 comprises one part of a stem that penetrates body 6 and has an oppositely projecting stem part 8. It may be noted that the distal end 9 of member 7 preferably is somewhat altered from conventional form, as will be described. The device shown may be maintained in proper upright position in the water by weight attached to member 7, as by either or both a sinker attached to a line and suspended from the end of member 7 and/or the spring means to be described and which, in its cocked condition, tends to maintain the float upright while in water.

Figure 1:
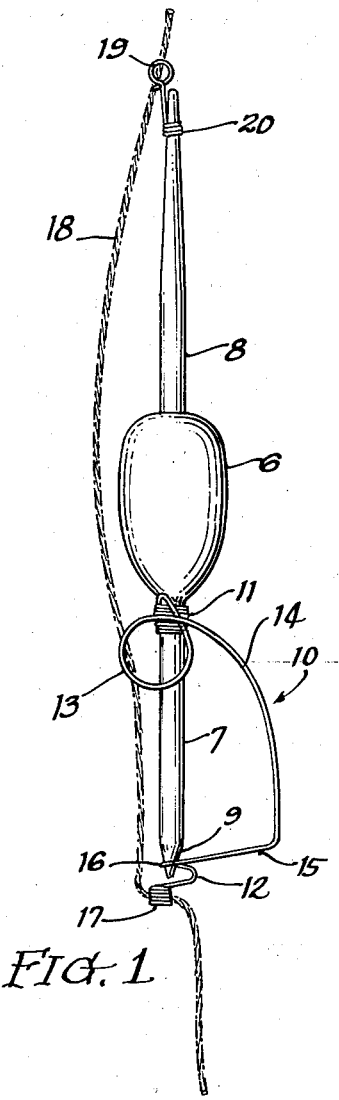
Fig. 1 is an elevation of a preferred form of device embodying the invention and showing the device in cocked condition.
Figure 3:
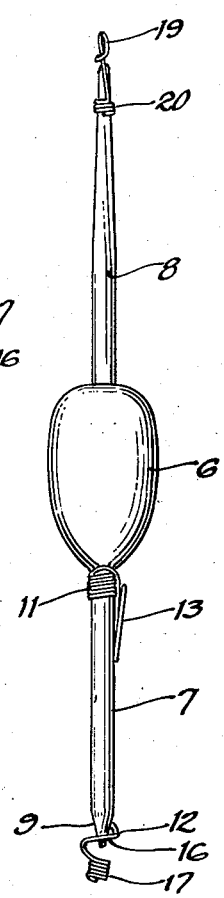
Fig. 3 is an elevation from the left hand side of the device as it is seen in Fig. 1.
Figure 4:
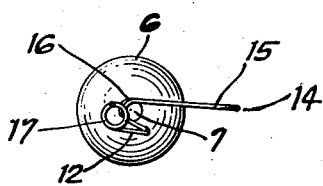
Fig. 4 is a bottom plan of the device in cocked condition.

The automatic fish-hooking spring means of the device, generally designated 10, comprises spaced first and second portions 11 and 12, the first of which, 11, is secured to the float at a location spaced from the distal end 9 of member 7, while the second, 12, constitutes a combined cocking and triggering arrangement for the spring means. Intermediate spring means portions 11, 12 is resilient structure 13 that biases portion 12 to a position spaced laterally of member 7 and in the general direction of body 6 from the distal end 9 of that member, that its, upwardly and outwardly from the distal member end 9 as the device is positioned in use. Spring means 10 is so arranged that portion 12 may be moved from its normal, released position, that to which it is biased and that seen in Fig. 2, to a position adjacent end 9 of member 7, as seen in Figs. 1, 3 and 4, resilient structure 13 being tensed to urge portion 12 toward its released position and to travel along a generally arcuate path extended substantially laterally from member end 9 and curving upwardly. Spring means portion 12 is arranged for cocking engagement with member 7 adjacent end 9 in such fashion as to be released readily by a slight pull exerted upon portion 12 in a direction away from body 6, that is, downward and in the normal direction of tug by a fish while the device is floating with a fish line attached to the spring means adjacent portion 12 thereof. Spring means 10 and the distal end 9 of member 7 are so arranged that a very gentle twitch or tug exerted on portion 12 in the indicated direction will cause portion 12 to move outward to the extremity of member end 9, and thereby be released to move laterally and upward under the urge of resilient structure 13.

Describing the specific, preferred form of spring means 10, shown in the drawings and which is particularly suited to the indicated mode of operation, involving securing the spring means in cocked condition by urging a part of portion 12 agaist a lateral surface portion of member 7 and releasing that part by moving it along the member to slip past its distal end 9, the first portion 11 comprises a coiled end of an elongate spring wire member 14 that operates in the general manner of a pivoted arm. The coil comprising portion 11 surrounds and grips member 7, preferably with sufficient freeness to permit sliding adjustment along the member but with sufficient firmness to maintain an adjusted position.

Adjacent the coil that constitutes the mounting portion 11, member 14 is formed longitudinally to provide, while the spring is cocked, a tensed resilient loop that in part constitutes the resilient intermediate portion 13 of the spring means, the resilience of the arm 14 also being effective, and that biases portion 12 to its normal, released position but permits it to be moved to its set or cocked position adjacent member end 9.

Between coiled portion 13 and portion 12, arm 14 is bent approximately at right angles to provide a triggering branch 15 of the arm, which carries the second or cocking portion 12.

The second portion 12 of spring means 10 comprises an offbent formation of the appropriate portion of the wire arm triggering branch 15, preferably being in the hook form shown at 16 and arranged to engage a surface portion of member 7 adjacent its distal end 9 and on the side of the member that is opposite to that alongside of which arm 14 extends while the spring means is cocked, and facing in the direction opposite that in which portion 12 is urged by resilient structure 13 while in that condition. It will be seen that additionally resilient structure 13 tends to maintain the hooked second spring means portion 12 in a position axially of member 7 that is determined by the axial position of the mounting coil portion 11 and the bent angle between the main and triggering branch portions of arm 14, and from which position portion 12 may be moved axially of member 7 and past its free end 9 by a tug in the appropriate direction. The resistance of the spring structure to such movement for a distance sufficient to release portion 12 may be selected or adjusted by changing the position of coil portion 11 along member 7 or, more conveniently, by changing the angle that branch 15 bears to the main portion of arm 14, which is readily accomplished by slight bending. This permits selection of the sensitivity of the device, that is the force of a tub necessary to trip it, to suit the preference of a user or to suit a particular variety of fish.

The spring means 10 is provided with an arrangement adjacent portion 12 for securely engaging a fish line so that upon release or tripping of the spring means, a fish-hooking jerk will be imparted to the line and to a hook attached to it. In the preferred form shown this arrangement comprises an axially tight coil 17 formed at the end of a spring arm 14 and between adjacent convolutions of which a line may be inserted and gripped, as shown.

Figure 2:
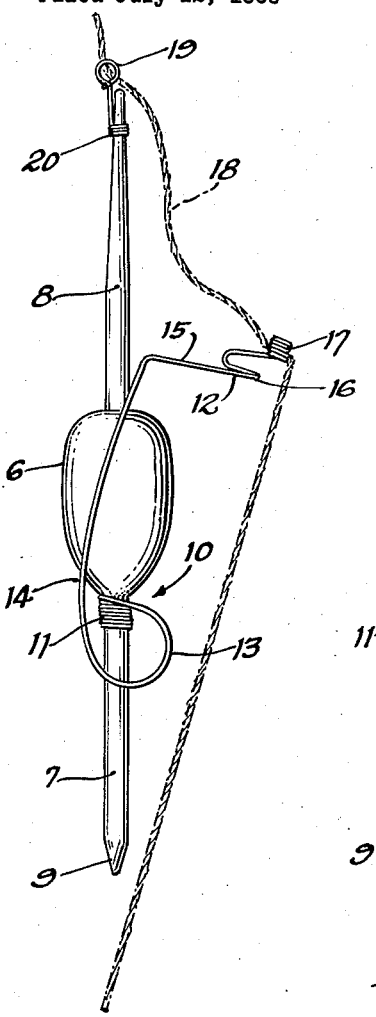
Fig. 2 is a similar view showing the device in tripped condition.

It is regarded as preferable that the float be provided with means for retaining a fish line between the point of securement of the latter to coil 17 and the fish pole, or other point of line securement, for example, the line portion 18 shown in Figs. 1 and 2. Preferably this is provided in the form of a guide ring 19 within which the line is freely retained, and it is shown as an element of wire having the line-receiving guide ring 19 formed as a loop and a coil 20 securely gripping the second stem 8 near its end.

The manner of use and operation of the device will be apparent. With the device in the condition of Fig. 1, and a baited hook suspended from coil 17 by a fish line, a tug of a strength sufficient to move portion 12 of the spring means past the end 9 of member 7 will result in a rapid jerk being imparted to the line and hook, in a direction that is most likely to hook the fish doing the tugging. Ordinarily the resilience of the spring means 10 will be selected to have a ready yield to gentle tugs, nibbles, and so on, of fish that are difficult to catch by reason of the characteristics of their biting, as described above, and the device herein disclosed has proven to be very effective in catching such fish.

The end portion of member 7 immediately adjacent end 9 has a well defined generally conical configuration, rather than the continuous taper and rounded end that is conventional in bobber stems, the taper being selected so that the inclination of the surface portion engaged by hook 16 will be at such an angular relation to the direction of force urging hook 16 against it, that the device may be coked without difficulty, but will be sprung by a slight disturbance of hook 16 relative to the inclined surface portion of member 7 that it engages.

The force of such a disturbance that is necessary to trip the device, as described above, readily may be adjusted by changing the angle of bend of arm branch 15, or by movement of coil 11 on member 7, and can be selected easily and rapidly by trial and error.

From the foregoing description, the construction, arrangement, mode of operation and the many advantages of the herein disclosed invention will be apparent, and it is to be understood that many changes in and modifications of the details of the exemplary specific structure set forth may be resorted to without departing from the scope of the invention as it is defined by the appended claims.

I claim:

1. An automatic fish-hooking device comprising a float including a body and a member projecting therefrom and having a distal end, said float being sufficiently buoyant to support a rigged fishing line of selected weight while floating free in water and being arranged to maintain said member with its distal end pointing downward while so floating during fishing, integral spring means including a first portion mounted to said float, a second portion spaced from said first portion, and an intermediate resilient loop connecting said first and second portions and biasing said second portion to a first position spaced from said distal member end in the general direction of said body, said resilient loop and second portion being arranged to permit swinging movement of the latter about the axis of the loop to a second position adjacent said distal member end, and said loop thereby being tensed, said spring means being extensible while said second portion is in its second position to permit said second portion to be passed over said distal member end, said second portion and distal member end being arranged for spring-cocking engagement by passing of the former over the end of the latter, said engagement being releasable by movement of said second portion along said member to said distal end, and means carried by said spring means adjacent said second portion for engaging a fish line.

2. A device according to claim 1, wherein said spring means comprises an integral elongate resilient arm having said loop formed therein, said loop biasing said second portion laterally outward and upward from said distal member end, said second portion comprising a hook adapted to engage a lateral surface portion of said member adjacent said distal end and on the opposite side of the member from the position to which it is biased, whereby said hook is urged against said member surface portion while the device is cocked, said lateral surface portion being inclined transversely inward and longitudinally outward from the position occupied by said hook and distal end and maintaining said spring member cocked, and means adjacent said offbent end for securement of a fishing line, and said loop permitting movement of said offbent part past said distal member end to trip the device in consequence of a tug on a fishing line attached to said means and exerted in a direction extended away from said body.

3. An automatic fish hooking device comprising a float including a body and a stem projecting therefrom and having a distal end spaced from said body, an integral elongate spring member having at one of its ends a coil slidably encircling and gripping said stem, said member having adjacent said coil an intermediate portion comprising a resilient loop, and a third portion spaced along said member to the opposite side of said loop from said coil, said third portion being movable to a position adjacent said distal stem end by flexure of said intermediate portion and tensing of said resilient member, said third portion comprising an offbent part of said member adapted to engage about said stem adjacent said distal end and maintain said spring member cocked, means adjacent said offbent end for securement of a fishing line, and said loop permitting movement of said offbent part past said distal member end to trip the device in consequence of a tub exerted on a fishing line attached to said means and exerted in a direction extended away from said body.

References Cited in the file of this patent

UNITED STATES PATENTS

| | | |
|---|---|---|
| 999,214 | Filipowski | Aug. 1, 1911 |
| 1,614,931 | Pennell | Jan. 18, 1927 |
| 1,805,410 | McCall | May 12, 1931 |
| 1,866,864 | Shroeder | July 12, 1932 |
| 2,316,256 | Kohn | Apr. 13, 1943 |
| 2,491,731 | Hall | Dec. 20, 1949 |
| 2,549,295 | Derby | Apr. 17, 1951 |
| 2,575,852 | Trowbridge | Nov. 20, 1951 |